United States Patent
Kaneko et al.

(10) Patent No.: US 10,794,249 B2
(45) Date of Patent: Oct. 6, 2020

(54) EXHAUST GAS PURIFICATION APPARATUS FOR INTERNAL COMBUSTION ENGINE AND CONTROL APPARATUS FOR INTERNAL COMBUSTION ENGINE

(71) Applicant: TOYOTA JIDOSHA KABUSHIKI KAISHA, Aichi-ken (JP)

(72) Inventors: Naoya Kaneko, Gotemba (JP); Hiromasa Hashimoto, Susono (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 11 days.

(21) Appl. No.: 16/357,232

(22) Filed: Mar. 18, 2019

(65) Prior Publication Data
US 2019/0284977 A1  Sep. 19, 2019

(30) Foreign Application Priority Data
Mar. 19, 2018  (JP) ................. 2018-051022

(51) Int. Cl.
*F01N 11/00* (2006.01)
*F01N 3/035* (2006.01)
(Continued)

(52) U.S. Cl.
CPC ........... *F01N 3/035* (2013.01); *F01N 3/023* (2013.01); *F01N 3/18* (2013.01); *F01N 9/002* (2013.01);
(Continued)

(58) Field of Classification Search
CPC ........ F01N 3/023; F01N 3/035; F01N 11/007; F01N 2900/1606; F01N 2900/1624
See application file for complete search history.

(56) References Cited

U.S. PATENT DOCUMENTS

2009/0151323 A1\* 6/2009 Severin ............... F01N 3/0814
    60/276
2012/0216507 A1\* 8/2012 Nieuwstadt ............ F01N 3/101
    60/274
(Continued)

FOREIGN PATENT DOCUMENTS

DE  102006025050 A1  11/2007
DE  102009000410 A1  7/2010
(Continued)

OTHER PUBLICATIONS

Unpublished U.S. Appl. No. 16/291,692, filed Mar. 4, 2019.
Unpublished U.S. Appl. No. 16/291,670, filed Mar. 4, 2019.

*Primary Examiner* — Jonathan R Matthias
(74) *Attorney, Agent, or Firm* — Hauptman Ham, LLP

(57) ABSTRACT

An amount of deposition of intramural PM in a particulate filter is estimated with a high degree of accuracy. A controller obtains, as a correlation between a reference value of an intramural PM deposition amount and an oxygen storage capacity of the catalyst, a change over time of an oxygen storage capacity of the catalyst according to a change of a filter PM deposition amount in a period of time from a point in time at which the filter PM deposition amount is substantially zero to a point in time at which the oxygen storage capacity of the catalyst, which becomes larger according to an increase of the filter PM deposition amount, reaches a maximum value. Further, the controller estimates a current intramural PM deposition amount based on a current oxygen storage capacity of the catalyst and the correlation.

4 Claims, 13 Drawing Sheets

(51) Int. Cl.
    *F01N 3/023*    (2006.01)
    *F01N 3/18*     (2006.01)
    *F01N 9/00*     (2006.01)

(52) U.S. Cl.
    CPC ........ *F01N 11/007* (2013.01); *F01N 2260/04* (2013.01); *F01N 2560/08* (2013.01); *F01N 2900/0601* (2013.01); *F01N 2900/1602* (2013.01); *F01N 2900/1606* (2013.01); *F01N 2900/1624* (2013.01)

(56) References Cited

U.S. PATENT DOCUMENTS

| | | |
|---|---|---|
| 2013/0305694 A1 | 11/2013 | Inoue et al. |
| 2014/0041362 A1 | 2/2014 | Ulrey et al. |
| 2018/0216514 A1* | 8/2018 | Nienhoff ............. F02D 41/1446 |

FOREIGN PATENT DOCUMENTS

| | | |
|---|---|---|
| DE | 102015219777 A1 | 4/2017 |
| EP | 3237731 A1 | 11/2017 |
| JP | 2010-13974 A | 1/2010 |
| RU | 2013137783 A | 2/2015 |
| WO | 2016103627 A1 | 6/2016 |

\* cited by examiner

EXHAUST GAS PURIFICATION APPARATUS FOR INTERNAL COMBUSTION ENGINE AND CONTROL APPARATUS FOR INTERNAL COMBUSTION ENGINE

This application claims the benefit of Japanese Patent Application No. 2018-051022, filed on Mar. 19, 2018, which is hereby incorporated by reference herein in its entirety.

BACKGROUND

Technical Field

The present disclosure relates to an exhaust gas purification apparatus for an internal combustion engine and a control apparatus for an internal combustion engine.

Description of the Related Art

A particulate filter (hereinafter, also sometimes referred to simply as a "filter") having a function of trapping particulate matter (hereinafter, sometimes referred to as "PM") in the exhaust gas may be arranged in an exhaust passage of an internal combustion engine. In addition, in the exhaust gas purification apparatus for an internal combustion engine provided with such a filter, there has been known a technique in which an amount of PM deposition in the filter is estimated based on a pressure difference of exhaust gas before and after the filter or a difference between the pressure of exhaust gas at the upstream side of the filter and atmospheric pressure (for example, refer to patent literature 1). Moreover, such a filter may be made to support a catalyst having an oxidizing capacity and an oxygen storage capacity (for example, refer to the patent literature 1). In cases where the catalyst having the oxidizing capacity is supported by the filter, PM deposited on the filter can be removed by oxidizing the deposited PM with the catalyst.

CITATION LIST

Patent Literature

Patent Literature 1: Japanese patent application laid-open publication No. 2010-13974

SUMMARY

In the filter arranged in the exhaust passage of the internal combustion engine, the amount of PM deposition increases gradually as trapped PM deposits. On the other hand, in cases where the filter supports the catalyst having the oxidizing capacity, when there occurs a situation in which the air fuel ratio of exhaust gas flowing into the filter is a lean air fuel ratio (i.e., an air fuel ratio larger than a stoichiometric air fuel ratio), and the temperature of the filter becomes a temperature at which PM can be oxidized (hereinafter, also sometimes referred to as a "PM oxidation temperature"), the PM deposited on the filter is oxidized. In addition, when a certain amount PM has deposited on the filter and the temperature of the filter is the PM oxidation temperature, in cases where a lot of oxygen is supplied to the filter by performing control such as so-called fuel cut-off control in which fuel injection in the internal combustion engine is stopped, there is a fear that the temperature of the filter will be raised to an excessive extent, due to the rapid progress of the oxidation of the PM.

Here, in the filter, PM deposits in the interior of a partition wall (i.e., inside of pores formed in the partition wall) of the filter, and on the surface of the partition wall. Hereinafter, the PM deposited in the interior of the partition wall of the filter is referred to as "intramural PM", and the PM deposited on the surface of the partition wall of the filter is referred to as "surface PM". Then, the inventor of the present disclosure has newly found that an excessive temperature rise of the filter tends to occur resulting from the oxidation of the intramural PM rather than the oxidation of the surface PM. In other words, even if a total amount of PM deposition in the filter is the same, the excessive temperature rise of the filter resulting from the oxidation of PM becomes easier to occur when the rate of the amount of deposition of the intramural PM is high, than when it is low. This is presumed to result from that the intramural PM is larger in the contact area with the catalyst supported by the filter than the surface PM, and hence the oxidation of the intramural PM is easier to be promoted than that of the surface PM. When taking account of such new knowledge, in cases where the occurrence of the excessive temperature rise of the filter is intended to be suppressed in an appropriate manner, it is desired to estimate the amount of deposition of the intramural PM in the filter with a high degree of accuracy.

The present disclosure has been made in view of the problems as referred to above, and has for its object to estimate an amount of deposition of intramural PM in a filter with a high degree of accuracy.

In the present disclosure, an amount of deposition of intramural PM in a filter may be estimated by using a correlation between the amount of deposition of the intramural PM and an oxygen storage capacity of a catalyst supported by the filter.

More specifically, an exhaust gas purification apparatus for an internal combustion engine according to the present disclosure may include: a particulate filter arranged in an exhaust passage of the internal combustion engine, and configured to support a catalyst having an oxidizing capacity and an oxygen storage capacity; a controller comprising at least one processor configured to estimate the oxygen storage capacity of the catalyst, obtain, as a correlation between a reference value of an intramural PM deposition amount, which is an amount of deposition of particulate matter in an interior of a partition wall of the particulate filter, and the oxygen storage capacity of the catalyst, a change over time of the oxygen storage capacity of the catalyst according to a change of a filter PM deposition amount, which is an amount of deposition of particulate matter in the particulate filter, in a period of time from a point in time at which the filter PM deposition amount is substantially zero to a point in time at which the oxygen storage capacity of the catalyst, which becomes larger according to an increase of the filter PM deposition amount, reaches a maximum value, and estimate a current value of the intramural PM deposition amount based on a current value of the oxygen storage capacity of the catalyst, and the correlation, after the correlation is obtained.

Here, in cases where PM deposits in the filter, there is a tendency that the PM first deposits mainly in the interior of the partition wall, and after that, deposits on the surface of the partition wall. On the other hand, the inventor of the present disclosure has newly found that in the filter configured to support the catalyst having the oxidizing capacity, in cases where PM is oxidized in a state where intramural PM and surface PM have deposited, there is a tendency that first, the intramural PM is mainly oxidized, and then, the surface PM is oxidized. This is presumed to result from that the intramural PM is larger in the contact area with the catalyst supported by the filter than the surface PM, and hence the oxidation of the intramural PM is easier to be promoted than that of the surface PM, as mentioned above. Moreover, the inventor of the present disclosure also has newly found that after the PM deposited in the filter is oxidized to some extent, in cases where PM begins to deposit again in a state where in the filter, the intramural PM remains and the surface PM has deposited without being substantially oxidized, the PM tends to deposit as surface PM. This is presumed due to the fact that in the state where the surface PM has deposited in the filter, PM is difficult to come into the interior of the partition wall.

In addition, there has been known a technique in which the filter PM deposition amount is estimated by integrating an amount of trapped PM and an amount of oxidized PM in the filter. However, in consideration of how the intramural PM and the surface PM deposit and how they are oxidized, a correlation between the filter PM deposition amount and the intramural PM deposition amount does not always necessarily have an univocal relation. For that reason, it is difficult to always estimate the intramural PM deposition amount with a high degree of accuracy based on the filter PM deposition amount.

Accordingly, the inventor of the present disclosure has focused on a correlation among the oxygen storage capacity of the catalyst supported by the filter, and the intramural PM deposition amount and a surface PM deposition amount. Specifically, the inventor of the present disclosure has newly found that the larger the intramural PM deposition amount, the larger the oxygen storage capacity of the catalyst tends to become, but on the other hand, even if the surface PM deposition amount changes, the oxygen storage capacity of the catalyst tends not to change. This is presumed due to the fact that as the intramural PM deposition amount increases, the flow path of the exhaust gas in the interior of the partition wall of the filter will change, thereby dispersing the flow path of the exhaust gas, as a result of which the area of the catalyst in contact with the exhaust gas in the interior of the partition wall becomes larger, thus increasing the amount of oxygen stored in the catalyst. In addition, this is also presumed due to the fact that even if the surface PM deposition amount changes, the flow path of the exhaust gas in the interior of the partition wall of the filter does not change, and hence the area of the catalyst in contact with the exhaust gas in the interior of the partition wall does not change either, and the amount of oxygen stored in the catalyst does not change.

Based on the above knowledge, in the present disclosure, the controller may obtain, as the correlation between the reference value of the intramural PM deposition amount and the oxygen storage capacity of the catalyst, the change over time of the oxygen storage capacity of the catalyst according to the change of the filter PM deposition amount in the period of time from the point in time at which the filter PM deposition amount is substantially zero to the point in time at which the oxygen storage capacity of the catalyst, which becomes larger according to the increase of the filter PM deposition amount, reaches the maximum value. Here, in the case where PM deposits in the filter from the state where the filter PM deposition amount is zero, the intramural PM first deposits, as mentioned above. In addition, as the intramural PM deposition amount increases, the oxygen storage capacity of the catalyst becomes accordingly larger. Then, when the intramural PM deposition amount reaches an upper limit value, the oxygen storage capacity of the catalyst will reach the maximum value. Accordingly, the change over time of the filter PM deposition amount in the period of time from the point in time at which the filter PM deposition amount is substantially zero to the point in time at which the oxygen storage capacity of the catalyst reaches the maximum value corresponds to the change over time of the intramural PM deposition amount. Moreover, the filter PM deposition amount in this period of time can be estimated by a conventional technique, e.g., a technique of integrating the amount of trapped PM and the amount of oxidized PM in the filter, etc. Accordingly, in the present disclosure, the change over time of the filter PM deposition amount in this period of time is grasped as the change over time of the reference value of the intramural PM deposition amount, and the controller may obtain the correlation between the reference value of the intramural PM deposition amount and the oxygen storage capacity of the catalyst.

Then, after the correlation between the reference value of the intramural PM deposition amount and the oxygen storage capacity of the catalyst is obtained, the controller may estimate the current intramural PM deposition amount based on the current oxygen storage capacity of the catalyst estimated by the oxygen storage capacity estimation unit and the correlation thus obtained. After the oxygen storage capacity of the catalyst once reaches the maximum value, i.e., after the intramural PM deposition amount once reaches the upper limit value, if the intramural PM deposition amount is decreased due to the oxidation of the intramural PM, the oxygen storage capacity of the catalyst will also become smaller according to the amount of decrease of the intramural PM deposition amount. On the other hand, even if the surface PM deposition amount changes, the oxygen storage capacity of the catalyst does not change. For that reason, the current intramural PM deposition amount corresponding to the current oxygen storage capacity of the catalyst can be estimated from the correlation between the intramural PM deposition amount and the oxygen storage capacity of the catalyst.

As described above, according to the present disclosure, the intramural PM deposition amount can be estimated with a high degree of accuracy by estimating the intramural PM deposition amount based on the oxygen storage capacity of the catalyst which is not affected by the influence of the surface PM deposition amount.

Here, in cases where the air fuel ratio of the exhaust gas flowing into the filter is made to change, the air fuel ratio of the exhaust gas at the downstream side of the filter accordingly changes, but the way how the air fuel ratio of the exhaust gas at the downstream side at this time is affected by the influence of a maximum storage oxygen amount of the catalyst supported by the filter (i.e., a maximum amount of oxygen in which oxygen can be stored in the catalyst). Accordingly, the exhaust gas purification apparatus for an internal combustion engine according to the present disclosure may be further provided with an air fuel ratio sensor configured to detect the air fuel ratio of exhaust gas at the downstream side of the filter, and an air fuel ratio controller comprising at least one processor configured to change the air fuel ratio of exhaust gas flowing into the filter. Then, the controller may calculate, as the oxygen storage capacity of the catalyst, the maximum oxygen storage amount of the catalyst based on a change of the air fuel ratio of the exhaust gas obtained by the air fuel ratio sensor at the time when the air fuel ratio of the exhaust gas is changed by the air fuel ratio controller.

Moreover, there has also known a technique of estimating the filter PM deposition amount based on a filter differential pressure, which is a difference between the pressure of the exhaust gas at the upstream side of the filter and a predetermined reference pressure (e.g., the pressure of the exhaust gas at the downstream side of the filter, or the atmospheric pressure). However, an amount of change of the filter differential pressure is different between the case where the intramural PM deposition amount changes, and the case where the surface PM deposition amount changes, even if amounts of change thereof are the same. For that reason, a correlation between the filter PM deposition amount and the filter differential pressure does not always necessarily have an univocal relation, and hence, it is difficult to estimate the filter PM deposition amount with a high degree of accuracy based only on the filter differential pressure.

Accordingly, in the exhaust gas purification apparatus for an internal combustion engine according to the present disclosure may be further provided with: a differential pressure sensor configured to detect a filter differential pressure. Further, the controller may estimate a current value of the filter PM deposition amount based on a current value of the intramural PM deposition amount and a current value of the filter differential pressure detected by the differential pressure sensor, after the point in time at which the oxygen storage capacity of the catalyst once reaches the maximum value. At this time, the controller may estimate the current value of the filter PM deposition amount based on the current value of the intramural PM deposition amount, the current value of the filter differential pressure, and a correlation between the filter PM deposition amount and the filter differential pressure represented by the following expression 1.

$$dPf = c1 \times Qfpm + (dP0 + dPin) \qquad \text{Expression 1}$$

where dPf: the filter differential pressure, c1: a rate of increase of the filter differential pressure when assuming that only the surface PM has deposited, Qfpm: the filter PM deposition amount, dP0: a filter differential pressure at the time when the filter PM deposition amount is zero, and dPin: a filter differential pressure increase amount corresponding to the intramural PM deposition amount.

Here, the correlation between the intramural PM deposition amount and the filter differential pressure can be obtained based on experiments, etc. For that reason, when the intramural PM deposition amount is estimated, the filter differential pressure increase amount dPin corresponding to the intramural PM deposition amount (i.e., an amount of increase with respect to the filter differential pressure dP0 at the time when the filter PM deposition amount is zero) can be obtained.

Further, the surface PM deposition amount and the filter differential pressure are in proportional relation with each other, and the rate of increase c1 of the filter differential pressure when assuming that only the surface PM has deposited (i.e., a unit amount of increase of the filter differential pressure per unit amount of increase of the surface PM deposition amount) can be obtained based on experiments, etc. Then, as mentioned above, there is a tendency that after the point in time at which the maximum oxygen storage amount of the catalyst once reaches the maximum value (i.e., the point in time at which the intramural PM once reaches the upper limit value), the increase of the filter PM deposition amount becomes resulting from depositing of the surface PM irrespective of the presence or absence of the oxidation of the intramural PM. Accordingly, after the point in time at which the maximum oxygen storage amount of the catalyst once reaches the maximum value, the rate of increase c1 of the filter differential pressure when assuming that only the surface PM deposition amount has increased corresponds to the unit amount of increase of the filter differential pressure per unit amount of increase of the filter PM deposition amount.

When the above points are taken into consideration, the correlation between the filter PM deposition amount and the filter differential pressure after the point in time at which the maximum oxygen storage amount of the catalyst once reaches the maximum value can be represented by the above-mentioned expression 1. For that reason, the filter PM deposition amount can be estimated with a high degree of accuracy by estimating the filter PM deposition amount based on the correlation between the filter PM deposition amount and the filter differential pressure represented by the above-mentioned expression 1.

In addition, in the internal combustion engine according to the present disclosure, an upper limit value of the temperature of the filter at which fuel cut-off control can be carried out may be set based on the intramural PM deposition amount and the filter PM deposition amount.

More specifically, a control apparatus for an internal combustion engine having an exhaust gas purification apparatus according to the present disclosure may be provided with at least one processor configured to carry out fuel cut-off control which stops fuel injection at the time of deceleration operation in the internal combustion engine, and set an upper limit value of the temperature of the particulate filter at which the fuel cut-off control can be carried out, based on the intramural PM deposition amount and the filter PM deposition amount.

As described above, an excessive temperature rise of the filter tends to occur resulting from the oxidation of the intramural PM rather than the oxidation of the surface PM. For that reason, by setting the upper limit value of the temperature of the filter at which the fuel cut-off control can be carried out based not only on the filter PM deposition amount but also on the intramural PM deposition amount, the excessive temperature rise of the filter accompanying the execution of the fuel cut-off control can be suppressed in a more suitable manner.

According to the present disclosure, an amount of deposition of intramural PM in a filter can be estimated with a high degree of accuracy.

DESCRIPTION OF THE EMBODIMENTS

Hereinafter, a specific embodiment of the present disclosure will be described based on the attached drawings. However, the dimensions, materials, shapes, relative arrangements and so on of component parts described in this embodiment are not intended to limit the technical scope of the present disclosure to these alone in particular as long as there are no specific statements.

Embodiment (Schematic Construction)

Figure 1:
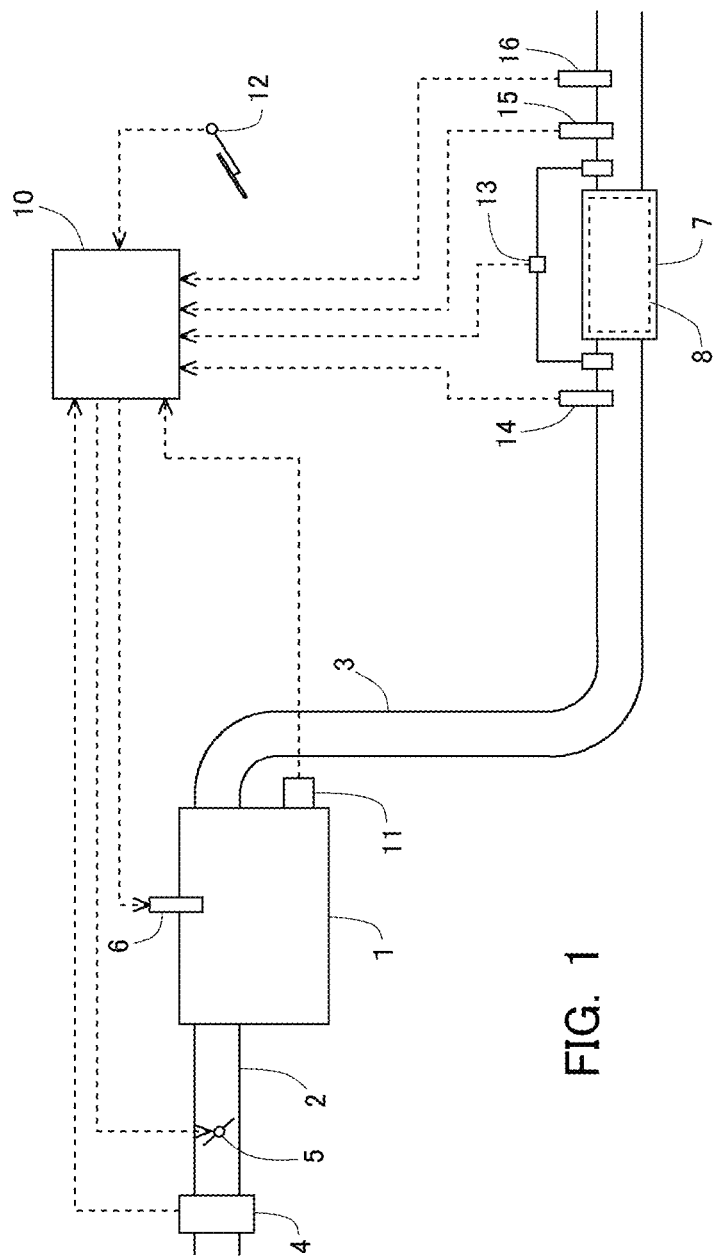
FIG. 1 is a view illustrating the schematic construction of an intake system and an exhaust system of an internal combustion engine according to an embodiment of the present disclosure.

FIG. 1 is a view illustrating the schematic construction of an intake system and an exhaust system of an internal combustion engine related to an embodiment of the present disclosure. The internal combustion engine denoted by 1 is a gasoline engine for driving a vehicle. However, the internal combustion engine related to the present disclosure is not limited to the gasoline engine, but may be a diesel engine. On the internal combustion engine 1, there is mounted a fuel injection valve 6 for each cylinder. Each fuel injection valve 6 may inject fuel into an intake port, or may directly inject fuel into a cylinder. In addition, an intake passage 2 and an exhaust passage 3 are connected to the internal combustion engine 1. In the intake passage 2, there are arranged an air flow meter 4 and a throttle valve 5. The air flow meter 4 detects a flow rate of intake air (i.e., an amount of intake air sucked into the internal combustion engine 1). The throttle valve 5 adjusts the amount of intake air in the internal combustion engine 1 by changing the cross-sectional area of a flow path of the intake air.

A particulate filter (hereinafter, referred to as a "filter") 7 is arranged in the exhaust passage 3. The filter 7 is a wall flow type filter that traps PM in the exhaust gas. The filter 7 has a plurality of partition walls, and serves to trap PM in the exhaust gas passing through fine pores formed in the partition walls. Then, in the filter 7, the PM thus trapped gradually deposits in the interior of each partition wall (i.e., inside of the fine pores formed in each partition wall), and on the surface of each partition wall.

In addition, a three-way catalyst 8 is supported by the filter 7. The three-way catalyst 8 has an oxidizing capacity and an oxygen storage capacity. Then, the three-way catalyst 8 stores oxygen by means of the oxygen storage capacity when the air fuel ratio of incoming exhaust gas is a lean air fuel ratio which is larger than a stoichiometric air fuel ratio, whereas the three-way catalyst 8 releases oxygen when the air fuel ratio of incoming exhaust gas is a rich air fuel ratio which is smaller than the stoichiometric air fuel ratio. Here, note that in this embodiment, the three-way catalyst 8 corresponds to a "catalyst" according to the present disclosure. However, the catalyst according to the present disclosure is not limited to the three-way catalyst, but instead of this, there may also be used another catalyst having an oxidizing capacity and an oxygen storage capacity.

A first air fuel ratio sensor 14 for detecting the air fuel ratio of exhaust gas is mounted on the exhaust passage 3 at the upstream side of the three-way catalyst 8. In addition, a second air fuel ratio sensor 15 for detecting the air fuel ratio of exhaust gas and a temperature sensor 16 for detecting the temperature of exhaust gas are mounted on the exhaust passage 3 at the downstream side of the three-way catalyst 8. Here, note that each of the first air fuel ratio sensor 14 and the second air fuel ratio sensor 15 may also be, for example, a limiting current type oxygen concentration sensor, or an electromotive force type (concentration cell type) oxygen concentration sensor ($O_2$ sensor). Moreover, in the exhaust passage 3, there is arranged a differential pressure sensor 13 that serves to detect a filter differential pressure which is a difference between the pressure of exhaust gas at the upstream side of the filter 7 and the pressure of exhaust gas at the downstream side of the filter 7. Accordingly, in this embodiment, the pressure of exhaust gas at the downstream side of the filter 7 corresponds to a "predetermined reference pressure" according to the present disclosure. However, instead of the differential pressure sensor 13, there may be employed a sensor for detecting, as the filter differential pressure, a difference between the pressure of exhaust gas at the upstream side of the filter 7 and the atmospheric pressure.

Then, an electronic control unit (ECU) 10 is provided in combination with the internal combustion engine 1. The ECU 10 controls the operating state of the internal combustion engine 1, an exhaust gas purification apparatus, etc. The air flow meter 4, the first air fuel ratio sensor 14, the second air fuel ratio sensor 15, the temperature sensor 16, and the differential pressure sensor 13 are electrically connected to the ECU 10. Further, a crank position sensor 11 and an accelerator opening sensor 12 are electrically connected to the ECU 10. Then, detected values of the individual sensors are inputted to the ECU 10.

The ECU 10 derives the engine rotational speed of the internal combustion engine 1 based on the detected value of the crank position sensor 11. Also, the ECU 10 derives the engine load of the internal combustion engine 1 based on the detected value of the accelerator opening sensor 12. Here, note that in this embodiment, the air fuel ratio of the exhaust gas flowing into the filter 7 can be detected by the first air fuel ratio sensor 14. The air fuel ratio of the exhaust gas flowing into the filter 7 can be also estimated based on an amount of intake air detected by the air flow meter 4 and an amount of fuel injected from each fuel injection valve 6. In addition, the ECU 10 derives the temperature of the filter 7 and the temperature of the three-way catalyst 8 based on the temperature of the exhaust gas detected by the temperature sensor 16. Here, note that the filter 7 and the three-way catalyst 8 are formed integrally with each other, so the temperature of the filter 7 and the temperature of the three-way catalyst 8 are equal to each other. Moreover, the temperature of the filter 7 and the temperature of the three-way catalyst 8 can be estimated based on the operating state of the internal combustion engine 1, without using the temperature sensor 16. Also, the throttle valve 5 and the fuel injection valves 6 are electrically connected to the ECU 10. Then, these devices are controlled by means of the ECU 10. For example, the ECU 10 carries out fuel cut-off control which stops fuel injection from each fuel injection valve 6 at the time of deceleration operation of the internal combustion engine 1. The ECU 10 achieves the fuel cut-off control by executing a program stored in advance in the ECU 10.

(Estimation of the Oxygen Storage Capacity of the Catalyst)

In this embodiment, the ECU 10 calculates, as the oxygen storage capacity of the three-way catalyst 8, a maximum oxygen storage amount of the three-way catalyst 8 (i.e., an upper limit value of an amount of oxygen which can be stored in the three-way catalyst 8) by using a so-called Cmax method. The maximum oxygen storage amount of the three-way catalyst 8 is in correlation with a period of time and an air fuel ratio of exhaust gas from the time when the air fuel ratio of the exhaust gas flowing into the three-way catalyst 8 has changed from the rich air fuel ratio to the lean air fuel ratio until the time when the air fuel ratio of the exhaust gas flowing out of the three-way catalyst 8 changes to the lean air fuel ratio. Similarly, the maximum oxygen storage amount of the three-way catalyst 8 is also in correlation with a period of time and an air fuel ratio of exhaust gas from the time when the air fuel ratio of the exhaust gas flowing into the three-way catalyst 8 has changed from the lean air fuel ratio to the rich air fuel ratio until the time when the air fuel ratio of the exhaust gas flowing out of the three-way catalyst 8 changes to the rich air fuel ratio. Accordingly, the maximum oxygen storage amount of the three-way catalyst 8 can be calculated based on these periods of time and air fuel ratios.

Figure 2:
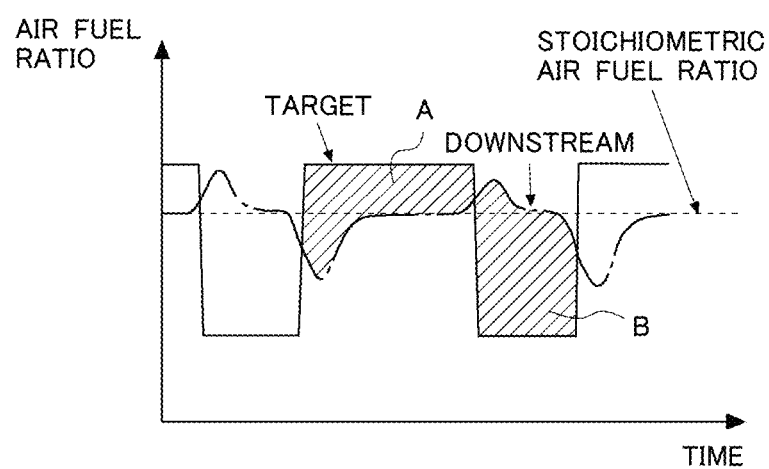
FIG. 2 is a view illustrating the changes over time of a target air fuel ratio and an air fuel ratio of exhaust gas at the downstream side of a three-way catalyst.

Here, a specific calculation method for the maximum oxygen storage amount of the three-way catalyst 8 will be explained based on FIG. 2. FIG. 2 is a view illustrating the changes over time of a target air fuel ratio (a solid line) and an air fuel ratio (an alternate long and short dash line) at the downstream side of the three-way catalyst 8 (i.e., at the downstream side of the filter 7). The target air fuel ratio is a target value of the air fuel ratio of a mixture in each cylinder of the internal combustion engine 1 (i.e., the air fuel ratio of the exhaust gas flowing into the three-way catalyst 8). When the maximum oxygen storage amount is calculated according to the Cmax method, active control is carried out which is to cause the target air fuel ratio to change across the stoichiometric air fuel ratio. The ECU 10 achieves the active control by executing a program stored in advance in the ECU 10.

FIG. 2 illustrates the changes over time of the target air fuel ratio and the air fuel ratio of exhaust gas at the downstream side of the three-way catalyst 8, at the time when the active control is carried out. In the active control, when the air fuel ratio of the exhaust gas at the downstream side of the three-way catalyst 8, i.e., the air fuel ratio detected by the second air fuel ratio sensor 15, changes from the rich air fuel ratio to the lean air fuel ratio, the target air fuel ratio is switched to the rich air fuel ratio, whereas when the air fuel ratio detected by the second air fuel ratio sensor 15 changes from the lean air fuel ratio to the rich air fuel ratio, the target air fuel ratio is switched to the lean air fuel ratio. The ECU 10 adjusts the amount of fuel injected from each fuel injection valve 6 so that an actual air fuel ratio in each cylinder becomes close to the target air fuel ratio.

Here, note that when the second air fuel ratio sensor 15 is an oxygen concentration sensor ($O_2$ sensor) of electromotive force type (concentration cell type), the target air fuel ratio is switched from the lean air fuel ratio to the rich air fuel ratio, immediately after the detected air fuel ratio changes from the rich air fuel ratio to the lean air fuel ratio. On the other hand, in cases where the second air fuel ratio sensor 15 is an oxygen concentration sensor of limiting current type, the target air fuel ratio may be switched when the detected air fuel ratio becomes a predetermined lean air fuel ratio. That is, even if the detected air fuel ratio becomes the lean air fuel ratio, the target air fuel ratio is not soon switched to the rich air fuel ratio, but the target air fuel ratio may be switched after the detected air fuel ratio has been maintained in a lean air fuel ratio state for a certain time. This is because even in cases where oxygen is released from the three-way catalyst 8, the air fuel ratio of the exhaust gas flowing out of the three-way catalyst 8 may strictly deviate from the stoichiometric air fuel ratio, and so, in such a case, the air fuel ratio should not be switched.

Then, in FIG. 2, the areas of ranges (hatched ranges) surrounded by a line indicating the target air fuel ratio and a line indicating the air fuel ratio at the downstream side of the three-way catalyst 8 are each proportional to the maximum oxygen storage amount of the three-way catalyst 8. Accordingly, if the relation between each area and the maximum oxygen storage amount has been obtained in advance through experiments or the like, it is possible to obtain the maximum oxygen storage amount based on this area. Here, note that when calculating the maximum oxygen storage amount of the three-way catalyst 8 by such a method, the maximum oxygen storage amount may be obtained based on an area A at the time when the target air fuel ratio is the lean air fuel ratio, or the maximum oxygen storage amount may be also obtained based on an area B at the time when the target air fuel ratio is the rich air fuel ratio, or the maximum oxygen storage amount may be further obtained based on an average value between the area A at the time when the target air fuel ratio is the lean air fuel ratio and the area B at the time when the target air fuel ratio is the rich air fuel ratio. Here, note that in the following, the processing of carrying out the active control and at the same time calculating the maximum oxygen storage amount of the three-way catalyst 8, as mentioned above, may be also referred to as "oxygen storage capacity calculation processing".

The ECU 10 estimates the maximum oxygen storage amount of the three-way catalyst 8 by executing a program stored in advance in the ECU 10. Also, note that in this embodiment, the oxygen storage capacity of the three-way catalyst 8 is obtained by the ECU 10 which calculates the maximum oxygen storage amount by using the Cmax method, as mentioned above, but as a technique of obtaining this, there may be adopted another well-known technique.

(First PM Deposition Amount Calculation Unit)

Figure 3:
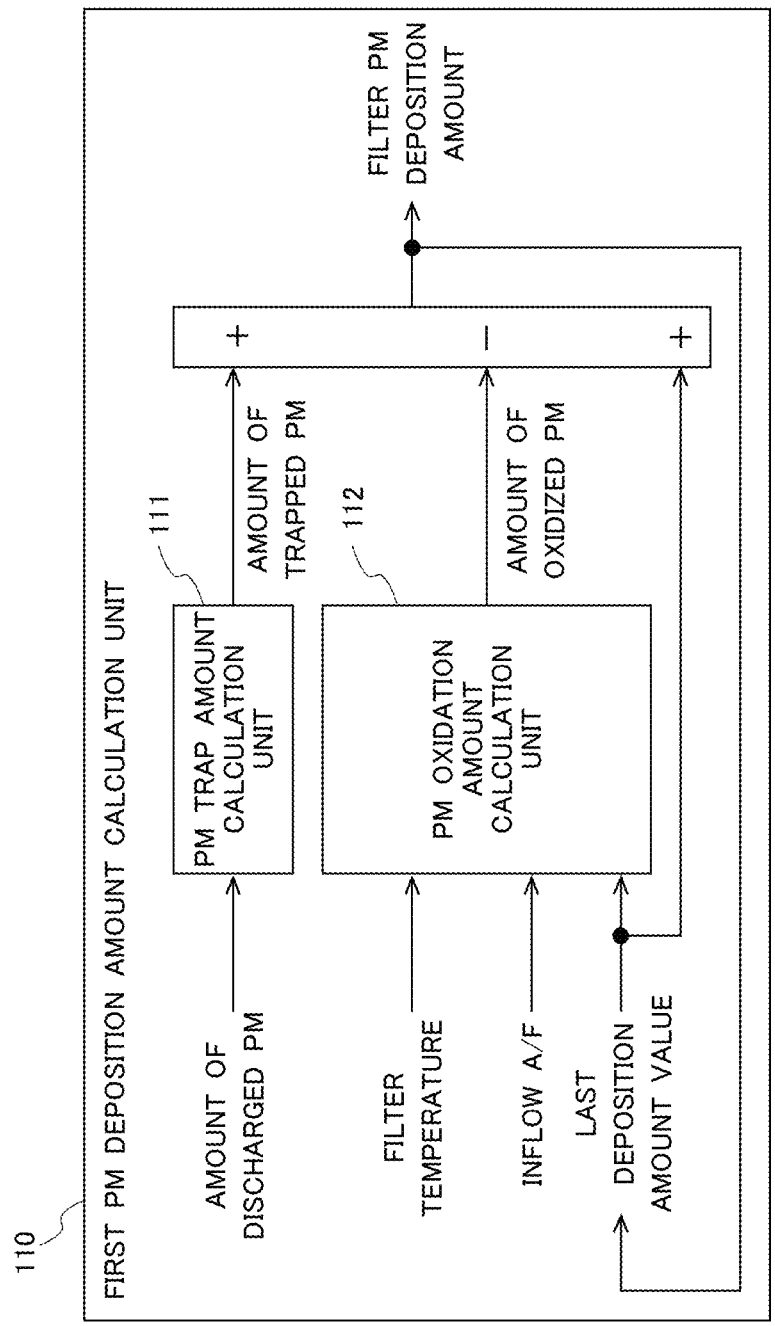
FIG. 3 is a block diagram illustrating the function of a first PM deposition amount calculation unit.

In addition, in this embodiment, the ECU 10 has, as a function unit, a first PM deposition amount calculation unit configured to calculate a filter PM deposition amount in a repeated manner at a predetermined operation interval by integrating an amount of trapped PM and an amount of oxidized PM in the filter 7. FIG. 3 is a block diagram illustrating the function of the first PM deposition amount calculation unit in the ECU 10. The first PM deposition amount calculation unit denoted by 110 and illustrated in FIG. 3 is achieved by executing a predetermined program in the ECU 10. Here, note that in the first PM deposition amount calculation unit 110 according to this embodiment, the filter PM deposition amount is calculated, by assuming that the PM trapping function of the filter 7 is in a normal state.

In the filter 7, the amount of PM deposition increases gradually as the trapped PM deposits. On the other hand, when a situation occurs where the air fuel ratio of the exhaust gas flowing into the filter 7 is the lean air fuel ratio, and where the temperature of the filter 7 becomes a PM oxidation temperature, the deposited PM is oxidized in the filter 7, and as a result, the amount of PM deposition decreases. Accordingly, in the first PM deposition amount calculation unit 110, a current filter PM deposition amount is calculated by integrating the amount of trapped PM which is an amount of PM trapped by the filter 7, and the amount of oxidized PM, which is an amount of PM oxidized in the filter 7. Specifically, the first PM deposition amount calculation unit 110 has a PM trap amount calculation unit 111 and a PM oxidation amount calculation unit 112. The PM trap amount calculation unit 111 calculates, as the amount of trapped PM, the amount of PM trapped by the filter 7 during a first predetermined period of time according to an operation (calculation) period of the filter PM deposition amount. The PM oxidation amount calculation unit 112 calculates, as the amount of oxidized PM, the amount of PM oxidized in the filter 7 during the first predetermined period of time.

An amount of PM discharged from the internal combustion engine 1 during the first predetermined period of time (an amount of discharged PM) is inputted to the PM trap amount calculation unit 111. The amount of discharged PM can be estimated based on the operating state of the internal combustion engine 1. In the PM trap amount calculation unit 111, the amount of trapped PM is calculated by multiplying a predetermined PM trapping efficiency (i.e., a ratio of the amount of PM trapped by the filter 7 with respect to the amount of PM flowing into the filter 7) to the amount of discharged PM thus inputted. Here, note that the predetermined PM trapping efficiency may be a value which is set based on a flow rate of exhaust gas.

On the other hand, the temperature of the filter 7 (filter temperature) and the air fuel ratio of the exhaust gas flowing into the filter 7 (inflow A/F) are inputted to the PM oxidation amount calculation unit 112. Further, the filter PM deposition amount calculated in the last calculation (the last deposition amount value) is inputted to the PM oxidation amount calculation unit 112. Then, in the PM oxidation amount calculation unit 112, the amount of oxidized PM is calculated based on the filter temperature, the inflow A/F and the last deposition amount value thus inputted.

Then, in the first PM deposition amount calculation unit 110, a present filter PM deposition amount (a current filter PM deposition amount) is calculated by adding the amount of trapped PM, which is an amount of increase, to the last deposition amount value, and at the same time by subtracting the amount of oxidized PM, which is an amount of decrease, from the last deposition amount value. Here, note that the present filter PM deposition amount thus calculated is used as the last deposition amount value in the case of the following calculation.

(Estimation of the Intramural PM Deposition Amount) As described above, in this embodiment, the fuel cut-off control is carried out at the time of the deceleration operation of the internal combustion engine 1. However, when the fuel cut-off control is carried out, a lot of oxygen will be supplied to the filter 7. For that reason, when the fuel cut-off control is carried out in a state where the temperature of the filter 7 is the PM oxidation temperature, and where the amount of PM deposited in the filter 7 is relatively large, there is a fear that the filter 7 may be subjected to an excessive temperature rise because of the rapid progress of oxidation of the PM. In addition, such an excessive temperature rise of the filter 7 has a tendency to occur resulting from the oxidation of intramural PM which is the PM deposited in the interior of each partition wall rather than the oxidation of surface PM which is the PM deposited on the surface of each partition wall. This is presumed to result from that the intramural PM is larger in the contact area with the three-way catalyst 8 supported by the filter 7 than the surface PM, and hence the oxidation of the intramural PM is easier to be promoted than that of the surface PM.

Figure 4:
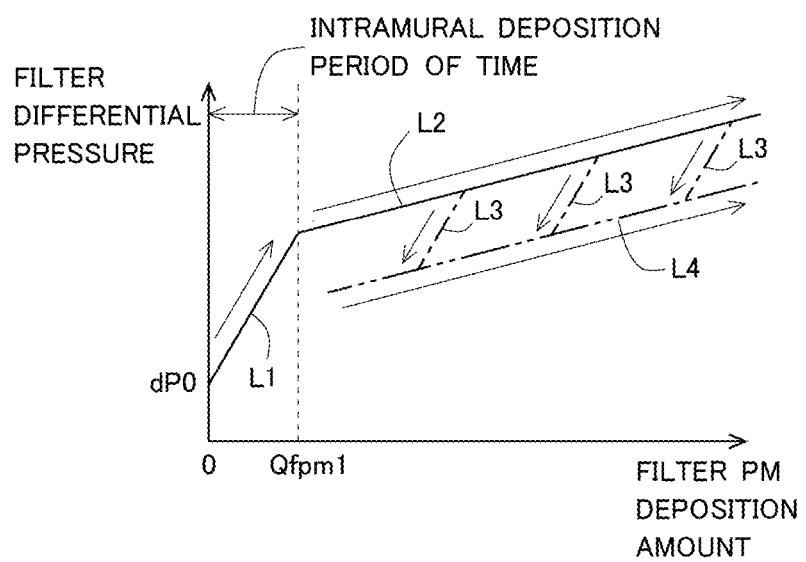
FIG. 4 is a view for explaining the change over time of a filter differential pressure according to a change of a filter PM deposition amount.

Accordingly, in this embodiment, the amount of deposition of the intramural PM in the filter 7 is estimated by the ECU 10 so as to suppress the occurrence of the excessive temperature rise of the filter 7 accompanying the execution of the fuel cut-off control. Hereinafter, a method of estimating the amount of deposition of the intramural PM according to this embodiment will be explained. In this embodiment, the filter differential pressure is detected by the differential pressure sensor 13. FIG. 4 is a view for explaining the change over time of the filter differential pressure according to the change of the filter PM deposition amount. In FIG. 4, the axis of abscissa represents the filter PM deposition amount, and the axis of ordinate represents the filter differential pressure.

In FIG. 4, the solid lines L1, L2 indicate the changes over time of the filter differential pressure at the time when the filter PM deposition amount increases from zero. In cases where the amount of PM deposition in the filter 7 increases from zero, the filter differential pressure changes in the direction of arrows along the solid lines L1 and L2. Here, in cases where PM deposits in the filter 7 from the state where the amount of PM deposition is zero, there is a tendency that first, intramural PM mainly deposits, and after that, surface PM deposits. Then, in FIG. 4, Qfpm1 indicates an upper limit value of the intramural PM deposition amount. In other words, the solid line L1 in a period of time in which the filter PM deposition amount reaches Qfpm1 from zero (hereinafter, also sometimes referred to as an "intramural deposition period of time") can be considered to indicate the change over time of the filter differential pressure according to the increase of the intramural PM deposition amount. Also, the solid line L2 after the intramural deposition period of time can be considered to indicate the change over time of the filter differential pressure according to the increase of the surface PM deposition amount. Here, note that as illustrated by the solid lines L1, L2 in FIG. 4, the amount of increase of the filter differential pressure per unit amount of increase of the intramural PM deposition amount tends to become larger than the amount of increase of the filter differential pressure per unit amount of increase of the surface PM deposition amount.

Moreover, When the temperature of the filter 7 is the PM oxidation temperature and the air fuel ratio of the exhaust gas flowing into the filter 7 becomes the lean air fuel ratio thereby to oxidize the PM in the filter, the filter differential pressure decreases. In FIG. 4, alternate long and short dash lines L3 indicate the changes over time of the filter differential pressure at the time when PM is oxidized in the state where the surface PM has deposited on the filter 7. Here, note that individual alternate long and short dash lines L3 indicate the changes over time of the filter differential pressure at the time when PM is oxidized at different timings, respectively. Here, even in cases where PM is oxidized in the state where the surface PM has deposited on the filter 7, first, the intramural PM tends to be mainly oxidized in the filter 7. Then, the surface PM tends to be oxidized, after the intramural PM is oxidized. This is presumed to result from that the intramural PM is larger in the contact area with the three-way catalyst 8 supported by the filter 7 than the surface PM, and hence the oxidation of the intramural PM is easier to be promoted than that of the surface PM. Then, similar to the case where the amount of PM deposition increases, the amount of decrease of the filter differential pressure per unit amount of decrease of the intramural PM deposition amount tends to become larger than the amount of decrease of the filter differential pressure per unit amount of decrease of the surface PM deposition amount. For that reason, in cases where PM is oxidized (i.e., in cases where the intramural PM is oxidized), the filter differential pressure changes in the direction of arrows along the alternate long and short dash lines L3, without changing along the solid line L2.

Further, after the oxidation of PM in the filter 7 stops, PM begins to deposit again in the filter 7. Then, when the amount of PM deposition in the filter 7 increases, the filter differential pressure increases again. In FIG. 4, an alternate long and two short dashes line L4 indicates the change over time of the filter differential pressure at the time when PM begins to deposit again, in a state where the intramural PM remains in the filter 7 and where the surface PM has deposited on the filter 7 without being substantially oxidized, after the intramural PM is oxidized to some extent in the filter 7. Here, in the case where PM begins to deposit again in the state where the surface PM has deposited on the filter 7, there is a tendency that in the filter 7, the intramural PM does not increase but the surface PM further deposits (i.e., the surface PM deposition amount increases). This is presumed due to the fact that in the state where the surface PM has deposited on the filter 7, PM is difficult to come into the interior of each partition wall. For that reason, in the case where PM deposits again, the filter differential pressure will increase with the increase of the surface PM deposition amount. Accordingly, the filter differential pressure changes in the direction of an arrow along the alternate long and two short dashes line L4, without increasing along the alternate long and short dash lines L3. At this time, the amount of increase of the filter differential pressure per unit amount of increase of the filter PM deposition amount in the alternate long and two short dashes line L4 becomes the amount of increase of the filter differential pressure per unit amount of increase of the surface PM deposition amount, and hence, the slope of the alternate long and two short dashes line 4 becomes equivalent to the slope of the solid line L2.

In consideration of how the intramural PM and the surface PM deposit and how they are oxidized as mentioned in the foregoing, it is found that the correlation between the filter PM deposition amount and the intramural PM deposition amount does not always necessarily have an univocal relation. In addition, it is also found that the correlation between the filter differential pressure and the intramural PM deposition amount does not always necessarily have an univocal relation, either. For that reason, it is difficult to always estimate the intramural PM deposition amount with a high degree of accuracy based on the filter PM deposition amount or the filter differential pressure.

Figure 5:
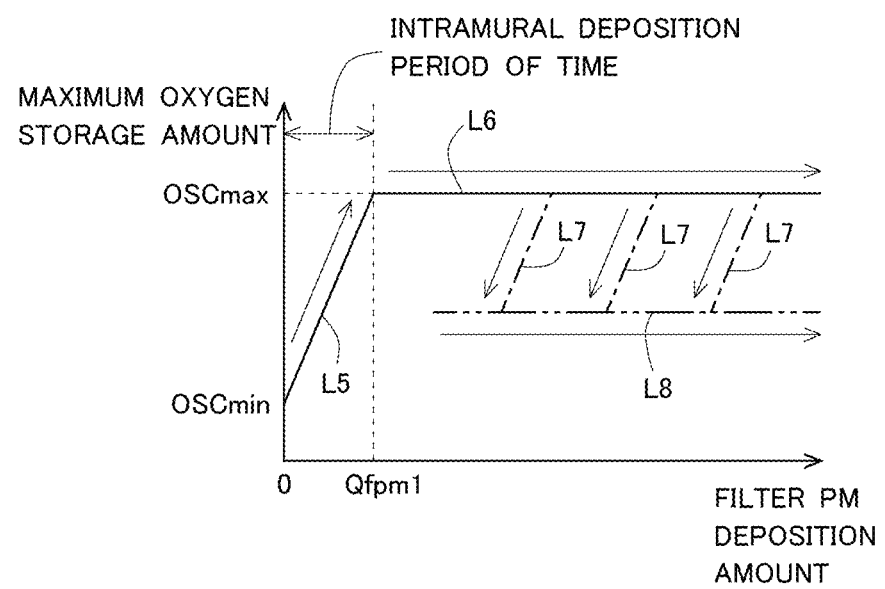
FIG. 5 is a view for explaining the change over time of a maximum oxygen storage amount according to the change of the filter PM deposition amount.

Accordingly, in this embodiment, there is adopted a technique of estimating the intramural PM deposition amount based on the maximum oxygen storage amount of the three-way catalyst 8 (hereinafter, also sometimes referred to simply as a "maximum oxygen storage amount") corresponding to the oxygen storage capacity of the three-way catalyst 8 supported by the filter 7. FIG. 5 is a view for explaining the change over time of the maximum oxygen storage amount according to the change of the filter PM deposition amount. In FIG. 5, the axis of abscissa represents the filter PM deposition amount, and the axis of ordinate represents the maximum oxygen storage amount.

In FIG. 5, solid lines L5, L6 indicate the changes over time of the filter differential pressure at the time when the maximum oxygen storage amount increases from zero. In other words, in cases where the amount of PM deposition in the filter 7 increases from zero, the maximum oxygen storage amount changes in the direction of arrows along the solid lines L5, L6. Here, in FIG. 5, Qfpm1 indicates an upper limit value of the intramural PM deposition amount, similar to FIG. 4. That is, in FIG. 5, the solid line L5 in the intramural deposition period of time can be considered to indicate the change over time of the maximum oxygen storage amount according to the increase in the intramural PM deposition amount. Also, the solid line L6 after the intramural deposition period of time can be considered to indicate the change over time of the maximum oxygen storage amount according to the increase in the surface PM deposition amount.

Here, as indicated by the solid line L5 in FIG. 5, when the filter PM deposition amount is zero, the maximum oxygen storage amount is a minimum value OSCmin. Then, as the intramural PM deposition amount increases, the maximum oxygen storage amount increases accordingly. On the other hand, as indicated by the solid line L6 in FIG. 5, even if the surface PM deposition amount increases, the maximum oxygen storage amount does not change. In other words, it is found that the larger the intramural PM deposition amount, the larger the maximum oxygen storage amount tends to become (i.e., the larger the oxygen storage capacity of the three-way catalyst 8 tends to become), but on the other hand, even if the surface PM deposition amount changes, the maximum oxygen storage amount does not change (i.e., the oxygen storage capacity of the three-way catalyst 8 does not change). For that reason, at a point in time at which the filter PM deposition amount increases to Qfpm1, i.e., when the intramural PM deposition amount reaches the upper limit value, the maximum oxygen storage amount becomes a maximum value OSCmax. Then, thereafter, even if the filter PM deposition amount further increases, i.e., even if the surface PM deposition amount increases, the maximum oxygen storage amount is maintained at the maximum value OSCmax.

Figure 6:
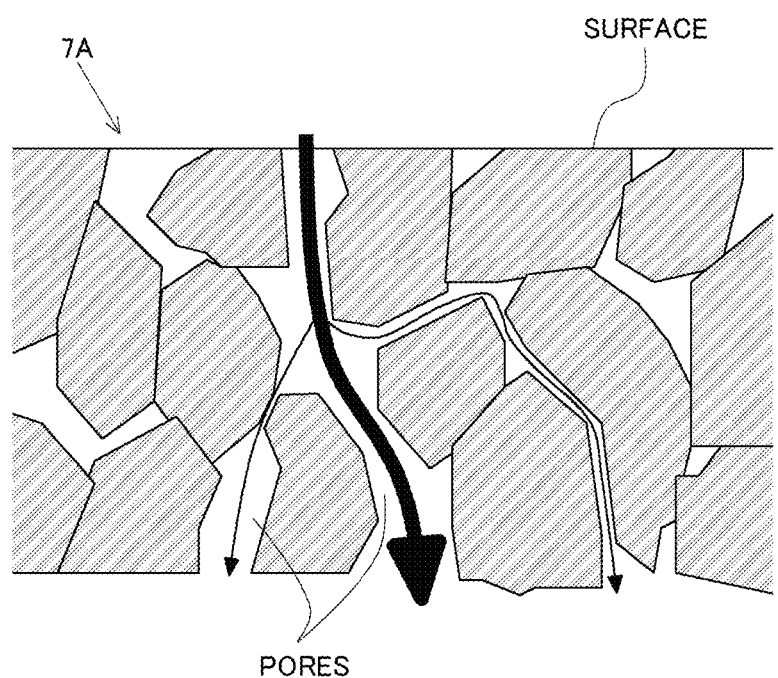
FIG. 6 is a view illustrating a flow path of exhaust gas at the time when PM has not deposited in a filter.
Figure 7:
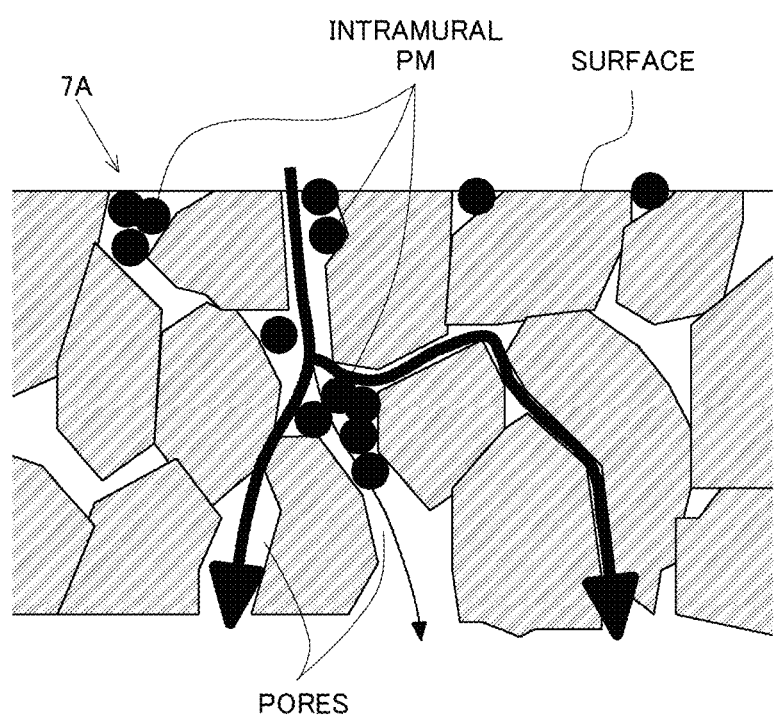
FIG. 7 is a view illustrating a flow path of exhaust gas at the time when PM has deposited in an interior of a partition wall of the filter.
Figure 8:
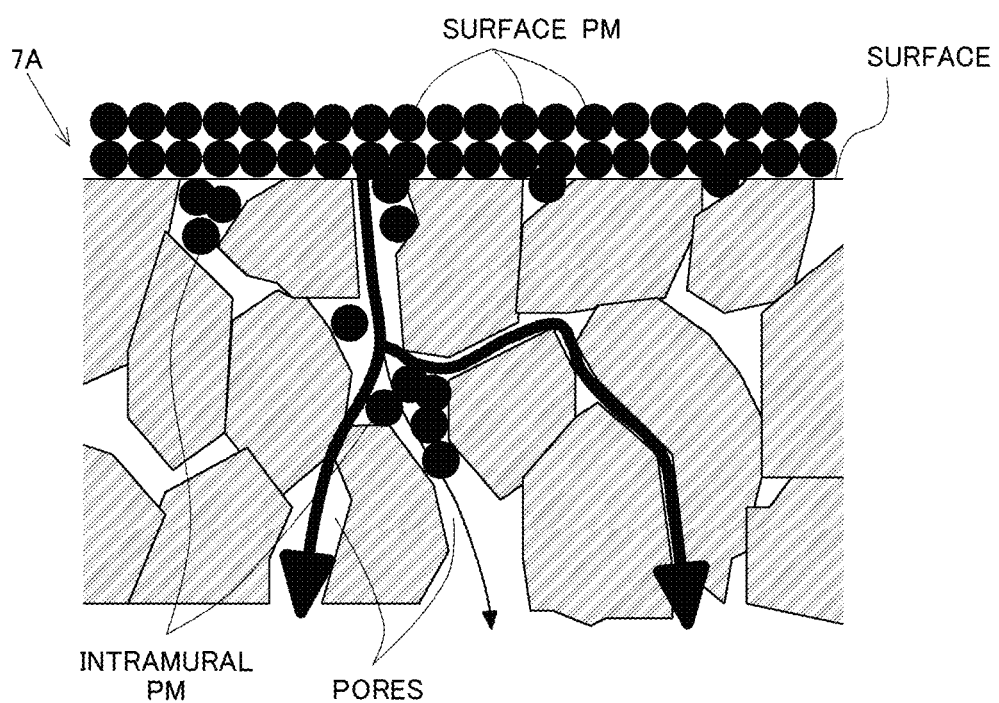
FIG. 8 is a view illustrating a flow path of exhaust gas at the time when PM has deposited in the interior and a surface of the partition wall of the filter.

The change over time of the maximum oxygen storage amount as mentioned above is presumed to result from the fact that the change of a flow path of exhaust gas in each partition wall of the filter 7 becomes different according to whether in the filter 7, the intramural PM deposition amount changes or the surface PM deposition amount changes. In the following, this will be explained in detail based on FIG. 6, FIG. 7 and FIG. 8. FIG. 6, FIG. 7 and FIG. 8 are views respectively illustrating flow paths of exhaust gas in a partition wall 7A of the filter 7. FIG. 6 is a view illustrating a flow path of exhaust gas at the time when PM has not deposited in the filter 7. In other words, FIG. 6 illustrates the flow path of exhaust gas at the time when the filter PM deposition amount is zero. FIG. 7 is a view illustrating a flow path of exhaust gas at the time when PM has deposited in the interior of the partition wall 7A of the filter 7. In other words, FIG. 7 illustrates the flow path of exhaust gas in the interior of the partition wall 7A in the intramural deposition period of time. FIG. 8 is a view illustrating a flow path of exhaust gas at the time when PM has deposited in the interior and the surface of the partition wall 7A of the filter 7. In FIG. 6, FIG. 7 and FIG. 8, the flow paths of exhaust gas are represented by arrows, and the flow rate of the exhaust gas is represented by the thickness of each arrow.

As illustrated in FIG. 6, in the state where PM has not deposited in the filter 7, the exhaust gas tends to flow through portions of relatively small pore sizes in the partition wall 7A, in comparison with portions of relatively large pore sizes therein. Then, when the exhaust gas flows through the interior of the partition wall 7A, oxygen will be stored in the three-way catalyst 8 supported on the wall surface of pores. For that reason, in the state where PM has not deposited in the filter 7, a larger amount of oxygen is stored in the portions of relatively large pore sizes in the interior of the partition wall 7A.

In addition, when the exhaust gas flows through the interior of the partition wall 7A, the PM having flowed into the partition wall 7A together with the exhaust gas will be trapped and deposited on the flow path of the exhaust gas. In that case, as illustrated in FIG. 7, the pores of relatively large pore sizes through which the larger amount of exhaust gas has flowed will come to be closed or blocked by the PM (intramural PM). As a result, in the interior of the partition wall 7A, a larger amount of exhaust gas will come to flow through the portions of relatively small pore sizes. In other words, as the intramural PM increases, the flow path of the exhaust gas in the interior of the partition wall 7A will accordingly change, thereby dispersing the flow path of the exhaust gas. That is, a larger amount of exhaust gas will come to flow through the portions of relatively small pore sizes, too. In that case, the surface area of the three-way catalyst 8 (i.e., the three-way catalyst supported on the wall surface of pores) in contact with the exhaust gas in the interior of the partition wall 7A will become larger. Therefore, it is presumed that the maximum oxygen storage amount will increase with the increase of the intramural PM deposition amount.

On the other hand, as illustrated in FIG. 8, even if PM deposits on the surface of the partition wall 7A in the state where the intramural PM deposition amount has reached the upper limit value, the flow path of the exhaust gas in the interior of the partition wall 7A does not change. For that reason, even if the surface PM deposition amount changes, the surface area of the three-way catalyst 8 in contact with the exhaust gas in the interior of the partition wall 7A does not change. Accordingly, it is presumed that even if the surface PM deposition amount changes, the maximum oxygen storage amount does not change.

Here, the description returns to the explanation of FIG. 5. In FIG. 5, alternate long and short dash lines L7 indicate the changes over time of the maximum oxygen storage amount at the time when PM is oxidized in the state where the surface PM has deposited on the filter 7. Here, note that individual alternate long and short dash lines L7 indicate the changes over time of the maximum oxygen storage amount at the time when PM is oxidized at different timings, respectively. As mentioned above, even in cases where PM is oxidized in the state where the surface PM has deposited on the filter 7, first, the intramural PM tends to be mainly oxidized in the filter 7. For that reason, in cases where PM is oxidized, the intramural PM will be oxidized, and hence, the filter differential pressure changes in the direction of arrows along the alternate long and short dash lines L7, without changing along the solid line L6. In other words, the maximum oxygen storage amount decreases with the decrease of the intramural PM due to the oxidation thereof.

Moreover, in FIG. 5, an alternate long and two short dashes line L8 indicates the change over time of the maximum oxygen storage amount at the time when PM begins to deposit again, in the state where the intramural PM remains in the filter 7 and where the surface PM has deposited on the filter 7 without being substantially oxidized, after the intramural PM is oxidized to some extent in the filter 7. As mentioned above, in the case where PM begins to deposit again in the state where the surface PM has deposited on the filter 7, there is a tendency that in the filter 7, the intramural PM does not increase but the surface PM further deposits. For that reason, in the case where PM deposits again, the maximum oxygen storage amount changes in the direction of an arrow along the alternate long and two short dashes line L8, without increasing along the alternate long and short dash lines L7. In other words, the maximum oxygen storage amount at the time of stop of the oxidation of the intramural PM will be maintained.

As explained above, in any of the case where PM deposits in the filter 7 and the case where PM is oxidized in the filter 7, the maximum oxygen storage amount does not change even if the surface PM deposition amount changes, but changes depending on the intramural PM deposition amount. For that reason, it is possible to estimate the intramural PM deposition amount based on the maximum oxygen storage amount.

Accordingly, in this embodiment, the minimum value OSCmin of the maximum oxygen storage amount is calculated by carrying out oxygen storage amount calculation processing when the filter PM deposition amount calculated by the first PM deposition amount calculation unit 110 is zero. Further, the maximum value OSCmax of the maximum oxygen storage amount is calculated by carrying out the oxygen storage amount calculation processing in a repeated manner according to the increase of the filter PM deposition amount calculated by the first PM deposition amount calculation unit 110. At this time, it can be determined that if the maximum oxygen storage amount does not change even when the filter PM deposition amount increases, the maximum oxygen storage amount at that point in time is the maximum value OSCmax. In addition, it can also be determined that the filter PM deposition amount at the point in time when the maximum oxygen storage amount reaches the maximum value OSCmax is the upper limit value Qfpm1 of the intramural PM deposition amount. Then, the change over time of the filter PM deposition amount calculated by the first PM deposition amount calculation unit 110 in a period of time from a point in time at which the filter PM deposition amount is substantially zero to the point in time at which the maximum oxygen storage amount reaches the maximum value OSCmax can be considered as the change over time of the intramural PM deposition amount in the intramural deposition period of time. Accordingly, the ECU 10 obtains the change over time of the maximum oxygen storage amount according to the change of the filter PM deposition amount calculated by the first PM deposition amount calculation unit 110 in this period of time, as a correlation between a reference value of the intramural PM deposition amount and the maximum oxygen storage amount. Their correlation thus obtained is stored in the ECU 10. Then, after that, the ECU 10 calculates a current intramural PM deposition amount based on the stored correlation between the reference value of the intramural PM deposition amount and the maximum oxygen storage amount, and based on a current maximum oxygen storage amount obtained by carrying out the oxygen storage amount calculation processing. In this manner, the intramural PM deposition amount can be estimated with a high degree of accuracy by estimating the intramural PM deposition amount based on the maximum oxygen storage amount which is not affected by the influence of the surface PM deposition amount.

(Second PM Deposition Amount Calculation Unit)

Here, as stated above, in this embodiment, in the intramural deposition period of time which is a period of time in which the filter PM deposition amount reaches Qfpm1 from the substantially zero, the first PM deposition amount calculation unit 110 in the ECU 10 calculates the filter PM deposition amount by integrating the amount of trapped PM and the amount of oxidized PM in the filter 7. Then, the change over time of the filter PM deposition amount in this intramural deposition period of time is used as the change over time of the reference value of the intramural PM deposition amount. However, in cases where the oxidation of the intramural PM or the redeposition of the surface PM occurs in a repeated manner after the intramural deposition period of time, there is a fear that the estimation accuracy of the filter PM deposition amount by the first PM deposition amount calculation unit 110 may become lower. In addition, it is also considered to adopt a technique of estimating the filter PM deposition amount based on the filter differential pressure detected by the differential pressure sensor 13, but as illustrated in FIG. 4, an amount of change of the filter differential pressure is different between the case where the intramural PM deposition amount changes, and the case where the surface PM deposition amount changes, even if amounts of change in these cases are the same. For that reason, a correlation between the filter PM deposition amount and the filter differential pressure does not always necessarily have an univocal relation, and hence, it is difficult to estimate the filter PM deposition amount with a high degree of accuracy based only on the filter differential pressure.

Figure 9:
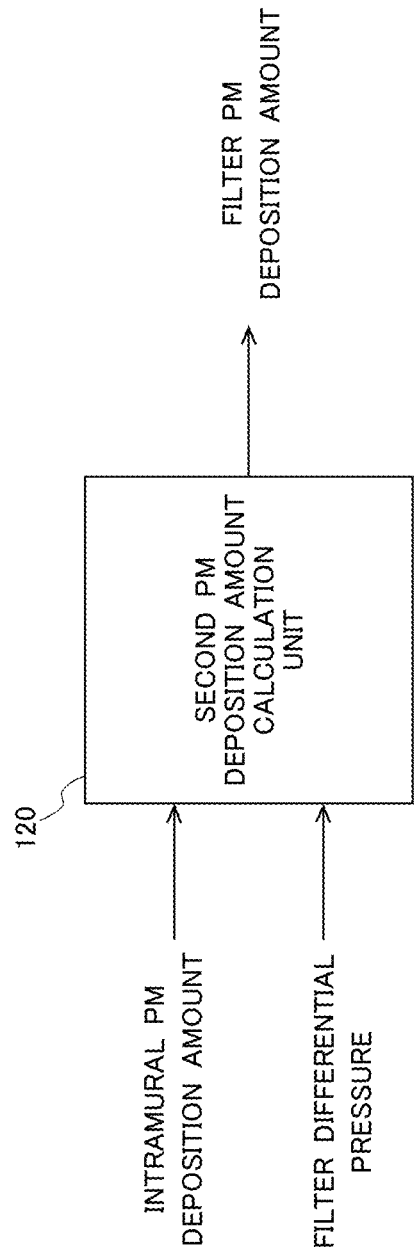
FIG. 9 is a block diagram illustrating the function of a second PM deposition amount calculation unit.

Accordingly, in the ECU 10 according to this embodiment, there is provided a second PM deposition amount calculation unit configured to calculate the filter PM deposition amount by a technique different from that in the first PM deposition amount calculation unit 110, after the intramural deposition period of time, i.e., after the point in time at which the oxygen storage capacity of the three-way catalyst 8 once reaches the maximum value. FIG. 9 is a block diagram illustrating the function of the second PM deposition amount calculation unit in the ECU 10. The second PM deposition amount calculation unit denoted by 120 and illustrated in FIG. 9 is achieved by executing a predetermined program in the ECU 10.

As described above, after the intramural deposition period of time, it is possible to estimate the intramural PM deposition amount based on the maximum oxygen storage amount of the three-way catalyst 8. As illustrated in FIG. 9, this intramural PM deposition amount estimated based on the maximum oxygen storage amount is inputted to the second PM deposition amount calculation unit 120. Moreover, the filter differential pressure detected by the differential pressure sensor 13 is inputted to the second PM deposition amount calculation unit 120. Then, the second PM deposition amount calculation unit 120 calculates the filter PM deposition amount based on these values. In the following, a method of calculating the filter PM deposition amount in the second PM deposition amount calculation unit 120 will be explained based on FIG. 10.

Figure 10:
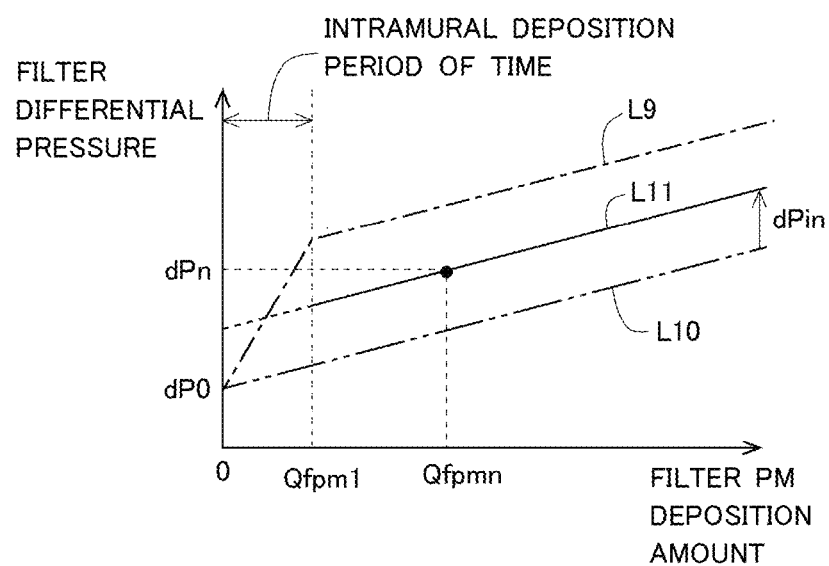
FIG. 10 is a view for explaining a method of calculating the filter PM deposition amount in the second PM deposition amount calculation unit.

In FIG. 10, the axis of abscissa represents the filter PM deposition amount, and the axis of ordinate represents the filter differential pressure. In addition, an alternate long and short dash line L9 in FIG. 10, similar to the solid lines L1, L2 in FIG. 4, illustrates the change over time of the filter differential pressure in the case where the intramural PM first deposits from the state where the filter PM deposition amount is zero, and thereafter the surface PM deposits. In other words, the alternate long and short dash line L9 indicates the change over time of the filter differential pressure at the time when the filter PM deposition amount increases from zero without PM being oxidized. For that reason, the alternate long and short dash line L9 indicates the change over time of the maximum value of the filter differential pressure with respect to the filter PM deposition amount. Moreover, an alternate long and two short dashes line L10 indicates the change over time of the filter differential pressure at the time of assuming that only the surface PM deposits from the state where the filter PM deposition amount is zero. As illustrated by the alternate long and two short dashes line L10, the surface PM deposition amount and the filter differential pressure are in proportional relation with each other. Then, the slope of the alternate long and two short dashes line L10 represents the rate of increase of the filter differential pressure which is a unit amount of increase of the filter differential pressure per unit amount of increase of the surface PM deposition amount. Further, the increase of the filter differential pressure after the intramural deposition period of time in the alternate long and short dash line L9 results from the deposition of the surface PM. For that reason, the slope of the alternate long and two short dashes line L10 becomes equivalent to the slope of the alternate long and short dash line L9 after the intramural deposition period of time. Furthermore, the amount of increase of the filter differential pressure per unit amount of increase of the surface PM deposition amount tends to become smaller than the amount of increase of the filter differential pressure per unit amount of increase of the intramural PM deposition amount, and hence, the alternate long and two short dashes line L10 indicates the change over time of the minimum value of the filter differential pressure with respect to the filter PM deposition amount.

As describe above, the alternate long and short dash line L9 indicates the change over time of the maximum value of the filter differential pressure with respect to the filter PM deposition amount, and the alternate long and two short dashes line L10 indicates the change over time of the minimum value of the filter differential pressure with respect to the filter PM deposition amount. Accordingly, in cases where the intramural PM is decreased due to its oxidation in any time after the intramural deposition period of time, the filter differential pressure becomes a value between the alternate long and short dash line L9 and the alternate long and two short dashes line L10. In addition, as mentioned above, in the state where the intramural PM remains after being decreased by a certain amount due to the oxidation thereof and the surface PM has deposited without being substantially oxidized, the surface PM increases, so the rate of increase of the filter differential pressure at that time becomes equivalent to the alternate long and two short dashes line L10. Then, the filter differential pressure at this time becomes a value which is obtained by adding an amount of increase dPin of the filter differential pressure corresponding to the intramural PM deposition amount to a value on the alternate long and two short dashes line L10 which is the filter differential pressure at the time when the intramural PM deposition amount is zero with only the surface PM deposited. Accordingly, the change over time of the filter differential pressure after the intramural deposition period of time becomes such as indicated by a solid line L11 in FIG. 10.

Then, the correlation between the filter PM deposition amount and the filter differential pressure after the intramural deposition period of time (i.e., after the point in time at which the maximum oxygen storage amount of the three-way catalyst 8 once reaches the maximum value), as indicated by the solid line L11 in FIG. 10, can be represented by the following expression 1.

$$dPf = c1 \times Qfpm + (dP0 + dPin)$$ Expression 1 where
    dPf: the filter differential pressure,
    c1: a rate of increase of the filter differential pressure at the time of assuming that only the surface PM has deposited,
    Qfpm: the filter PM deposition amount,
    dP0: a filter differential pressure at the time when the filter PM deposition amount is in zero, and
    dPin: a filter differential pressure increase amount corresponding to the intramural PM deposition amount.

In this embodiment, the correlation between the intramural PM deposition amount and the filter differential pressure obtained based on experiments, etc., has also been stored in advance in the ECU 10 as a map or a function. Then, the second PM deposition amount calculation unit 120 calculates, based on the inputted current intramural PM deposition amount, the filter differential pressure increase amount dPin corresponding thereto. In addition, the correlation between the filter PM deposition amount and the filter differential pressure represented by the above-mentioned expression 1 has been stored in advance in the ECU 10 as a map or a function. Accordingly, the second PM deposition amount estimation unit 120 calculates the current filter PM deposition amount based on the calculated filter differential pressure increase amount dPin, the inputted current filter PM deposition amount, and the correlation between the filter PM deposition amount and the filter differential pressure represented by the above-mentioned expression 1. Thus, the filter PM deposition amount can be estimated with a high degree of accuracy by estimating the filter PM deposition amount with the use of not only the filter differential pressure but also the intramural PM deposition amount estimated highly accurately.

(PM Deposition Amount Estimation Flow)

Figure 11:
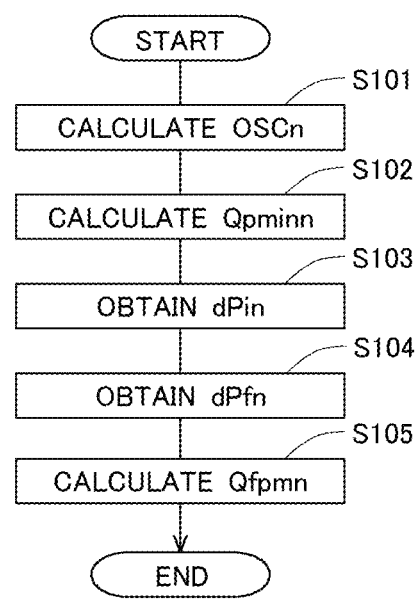
FIG. 11 is a flow chart illustrating a flow when estimating an intramural PM deposition amount and the filter PM deposition amount.

Next, reference will be made to a flow or routine at the time of estimating the intramural PM deposition amount and the filter PM deposition amount according to this embodiment, based on a flow chart illustrated in FIG. 11. This flow or routine is stored in advance in the ECU 10, and is repeatedly carried out at a predetermined interval during the operation of the internal combustion engine 1 and after the intramural deposition period of time. Here, note that in a period of time after the filter PM deposition amount estimated by the first PM deposition amount calculation unit 110 becomes zero and before the intramural deposition period of time elapses, the ECU 10 obtains the correlation between the reference value of the intramural PM deposition amount and the maximum oxygen storage amount by carrying out the oxygen storage capacity calculation processing in a repeated manner, as mentioned above. For that reason, the correlation between them has been stored in the ECU 10 in the period of time in which this flow or routine is carried out.

In this routine, first, in step S101, the above-mentioned oxygen storage capacity calculation processing is carried out, thereby calculating a current maximum oxygen storage amount OSCn of the three-way catalyst 8. Then, in step S102, a current intramural PM deposition amount Qpminn is calculated based on the correlation between the reference value of the intramural PM deposition amount and the maximum oxygen storage amount stored in the ECU 10, and based on the current maximum oxygen storage amount. Note that the intramural PM deposition amount Qpminn calculated here is stored in the ECU 10. Subsequently, in step S103, the filter differential pressure increase amount dPin corresponding to the current maximum oxygen storage amount OSCn is calculated based on the correlation between the intramural PM deposition amount and the filter differential pressure stored in the ECU 10.

Thereafter, in step S104, a current filter differential pressure dPfn detected by the differential pressure sensor 13 is obtained. Then, in step S105, a current filter PM deposition amount Qfpmn is calculated based on the filter differential pressure increase amount dPin calculated in step S103, the current filter differential pressure dPfn obtained in step S104, and the correlation between the filter PM deposition amount and the filter differential pressure which has been stored in the ECU 10 and which is represented by the above-mentioned expression 1. Here, note that the filter PM deposition amount Qfpmn calculated here is stored in the ECU 10.

Moreover, as mentioned above, this routine is carried out repeatedly at the predetermined interval, so the intramural PM deposition amount and the filter PM deposition amount will be repeatedly calculated at the predetermined interval. For that reason, these values stored in the ECU 10 will be updated at the predetermined interval.

(Upper Limit Temperature)

Figure 12:
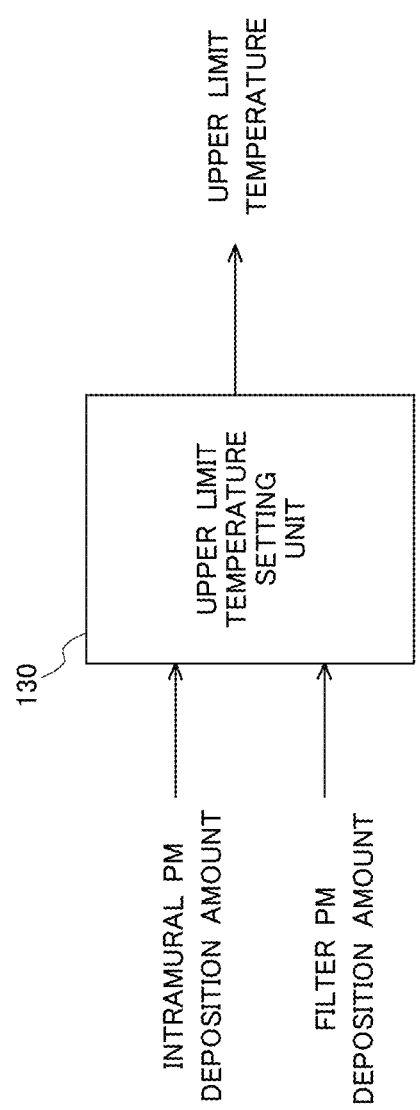
FIG. 12 is a block diagram illustrating the function of an upper limit temperature setting unit.

In this embodiment, an upper limit value of the temperature of the filter 7 (hereinafter, also sometimes referred to simply as an "upper limit temperature") at which the fuel cut-off control can be carried out is set in order to suppress the occurrence of an excessive temperature rise of the filter 7 accompanying the execution of the fuel cut-off control. FIG. 12 is a block diagram illustrating the function of an upper limit temperature setting unit in the ECU 10. The upper limit temperature setting unit 130 illustrated in FIG. 12 is achieved by executing a predetermined program in the ECU 10.

As illustrated in FIG. 12, the intramural PM deposition amount and the filter PM deposition amount estimated by the technique as mentioned above are inputted to the upper limit temperature setting unit 130. Then, the upper limit temperature setting unit 130 calculates the upper limit temperature based on these values thus inputted. Here, note that as mentioned above, the intramural PM deposition amount and the filter PM deposition amount are repeatedly calculated at the predetermined interval, and hence, when these values stored in the ECU 10 are updated, new values are inputted to the upper limit temperature setting unit 130, too.

Figure 13:
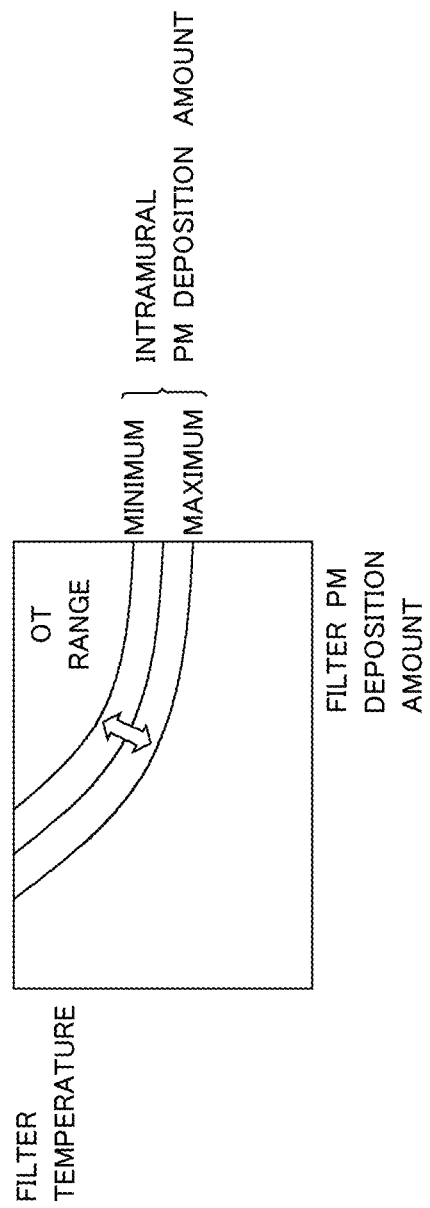
FIG. 13 is a view illustrating correlations among the intramural PM deposition amount, the filter PM deposition amount, and the upper limit temperature.

Here, reference will be made to correlations among the intramural PM deposition amount, the filter PM deposition amount, and the upper limit temperature based on FIG. 13. In FIG. 13, the axis of abscissa represents the filter PM deposition amount, and the axis of ordinate represents the filter temperature. Then, each solid line in FIG. 13 indicates a correlation between the intramural PM deposition amount and the upper limit temperature. In other words, a temperature zone above each solid line in FIG. 13 represents a range (i.e., OT range) in which the excessive temperature rise of the filter 7 may occur in the case where the fuel cut-off control is carried out.

As illustrated in FIG. 13, the more the filter PM deposition amount, the lower the upper limit temperature becomes. This is because the more the filter PM deposition amount, the more largely the temperature of the filter 7 goes up in the case where PM is oxidized. Further, the excessive temperature rise of the filter 7 tends to occur resulting from the oxidation of the intramural PM rather than the oxidation of the surface PM, as referred to above. For that reason, the correlation between the filter PM deposition amount and the upper limit temperature changes according to the intramural PM deposition amount, as illustrated in FIG. 13. In other words, in cases where the filter PM deposition amount is the same, the more the intramural PM deposition amount (i.e., the higher the rate of the intramural PM deposition amount in the filter PM deposition amount), the lower the upper limit temperature becomes. Accordingly, the more the intramural PM deposition amount, the wider the OT range becomes. Stated another way, the smaller the intramural PM deposition amount, the narrower the OT range becomes.

Here, the correlations among the intramural PM deposition amount, the filter PM deposition amount, and the upper limit temperature as illustrated in FIG. 13 can be obtained in advance based on experiments, etc. Accordingly, in this embodiment, the correlations among them have been stored in the ECU 10. Then, the upper limit temperature setting unit 130 calculates the upper limit temperature based on the correlations among them stored, the intramural PM deposition amount and the filter PM deposition amount inputted. In addition, the upper limit temperature setting unit 130 sets the upper limit temperature to the value thus calculated.

Then, the ECU 10 controls the operating state of the internal combustion engine 1 based on the upper limit temperature set as mentioned above, in order to suppress the occurrence of the excessive temperature rise of the filter 7. Specifically, the ECU 10 controls the operating state of the internal combustion engine 1 so that the temperature of the filter 7 does not exceed the upper limit temperature. Alternatively, the ECU 10 inhibits the execution of the fuel cut-off control, when the temperature of the filter 7 exceeds the upper limit temperature at the time when the operating state of the internal combustion engine 1 is shifted to a deceleration operation.

In this case, by setting the upper limit temperature based on the intramural PM deposition amount and the filter PM deposition amount calculated as mentioned above, it is possible to suppress the control for suppressing the occurrence of the excessive temperature rise of the filter 7 from being carried out unnecessarily, while suppressing the occurrence of the excessive temperature rise of the filter 7 with a higher probability. Accordingly, the excessive temperature rise of the filter 7 accompanying the execution of the fuel cut-off control can be suppressed in a more suitable manner.

What is claimed is:

1. An exhaust gas purification apparatus for an internal combustion engine comprising:
   a particulate filter arranged in an exhaust passage of the internal combustion engine, and configured to support a catalyst having an oxidizing capacity and an oxygen storage capacity; and
   a controller comprising at least one processor configured to
      estimate the oxygen storage capacity of the catalyst,
      obtain, as a correlation between a reference value of an intramural PM deposition amount, which is an amount of deposition of particulate matter in an interior of a partition wall of the particulate filter, and the oxygen storage capacity of the catalyst, a change over time of the oxygen storage capacity of the catalyst according to a change of a filter PM deposition amount, which is an amount of deposition of particulate matter in the particulate filter, in a period of time from a point in time at which the filter PM deposition amount is substantially zero to a point in time at which the oxygen storage capacity of the catalyst, which becomes larger according to an increase of the filter PM deposition amount, reaches a maximum value, and
      estimate a current value of the intramural PM deposition amount based on a current value of the oxygen storage capacity of the catalyst and the correlation, after the correlation is obtained.

2. The exhaust gas purification apparatus for an internal combustion engine as set forth in claim 1, further comprising:
   an air fuel ratio sensor configured to detect an air fuel ratio of exhaust gas at the downstream side of the particulate filter; and
   an air fuel ratio controller comprising at least one processor configured to change an air fuel ratio of exhaust gas flowing into the particulate filter;
   wherein the controller calculates, as the oxygen storage capacity of the catalyst, a maximum oxygen storage amount of the catalyst based on a change of the air fuel ratio of the exhaust gas obtained by the air fuel ratio sensor at the time when the air fuel ratio of the exhaust gas is changed by the air fuel ratio controller.

3. The exhaust gas purification apparatus for an internal combustion engine as set forth in claim 1, further comprising:
   a differential pressure sensor configured to detect a filter differential pressure which is a difference between a pressure of exhaust gas at the upstream side of the particulate filter and a predetermined reference pressure;
   wherein the controller, further, estimates a current filter PM deposition amount based on the current value of the intramural PM deposition amount, a current value of the filter differential pressure detected by the differential pressure sensor, and a correlation between the filter PM deposition amount and the filter differential pressure represented by the following expression 1, after the point in time at which the oxygen storage capacity of the catalyst once reaches the maximum value;

wherein $dPf = c1 \times Qfpm + (dP0 + dPin)$        Expression 1, where
   $dPf$: the filter differential pressure,
   $c1$: a rate of increase of the filter differential pressure at the time of assuming that particulate matter deposited only on a surface of the partition wall of the particulate filter,
   $Qfpm$: the filter PM deposition amount,
   $dP0$: a filter differential pressure at the time when the filter PM deposition amount is zero, and
   $dPin$: a filter differential pressure increase amount corresponding to the intramural PM deposition amount.

4. The control apparatus for an internal combustion engine having the exhaust gas purification apparatus as set forth in claim 3, the control apparatus comprising at least one processor configured to
   carry out fuel cut-off control which stops fuel injection at the time of deceleration operation in the internal combustion engine, and
   set an upper limit value of the temperature of the particulate filter at which the fuel cut-off control can be carried out, based on the intramural PM deposition amount and the filter PM deposition amount.

* * * * *